Sept. 28, 1948.  V. E. GLEASMAN  2,450,129
ENGINE STARTER GEARING
Filed July 1, 1946

WITNESS:
Esther M. Stockton

INVENTOR.
Vernon E. Gleasman
BY
Clinton S. Janes
ATTORNEY

Patented Sept. 28, 1948

2,450,129

UNITED STATES PATENT OFFICE 2,450,129

ENGINE STARTER GEARING

Vernon E. Gleasman, Elmira, N. Y., assignor to Bendix Aviation Corporation, Elmira Heights, N. Y., a corporation of Delaware Application July 1, 1946, Serial No. 680,535

3 Claims. (Cl. 74—7)

The present invention relates to engine starter gearing and more particularly to a heavy duty drive of the type employing a friction clutch as a yielding element for absorbing excessive shock loads.

In commercial heavy duty drives such as used for instance to start large Diesel engines, it is customary to use a starter drive incorporating a multiple disc friction clutch which is arranged to slip on the application of a predetermined overload. In order to control the capacity of the clutch, the discs are compressed by spring means which are adjustable for the purpose of securing the desired frictional contact.

Although drives of this type have attained wide commercial acceptance and are extensively used, it has been found difficult to maintain the calibration of the clutch over long periods of use, due to the effects of wear, lack of lubrication, etc. Moreover, the static or "break-away" friction is considerably greater than the torque transmitted while the clutch is slipping. Consequently, it is necessary to set the clutch so that its static load capacity is greater than the torque needed to crank the engine, thus causing the operation of the drive to be unnecessarily harsh.

It is an object of the present invention to provide a novel starter drive incorporating a friction clutch which is arranged to slip on the application of a predetermined torque, and to transmit, while slipping, substantially the same torque load.

It is another object to provide such a device which is readily adjustable to vary the torque capacity of the clutch, and which retains its calibration over long periods of use.

Figure 1:
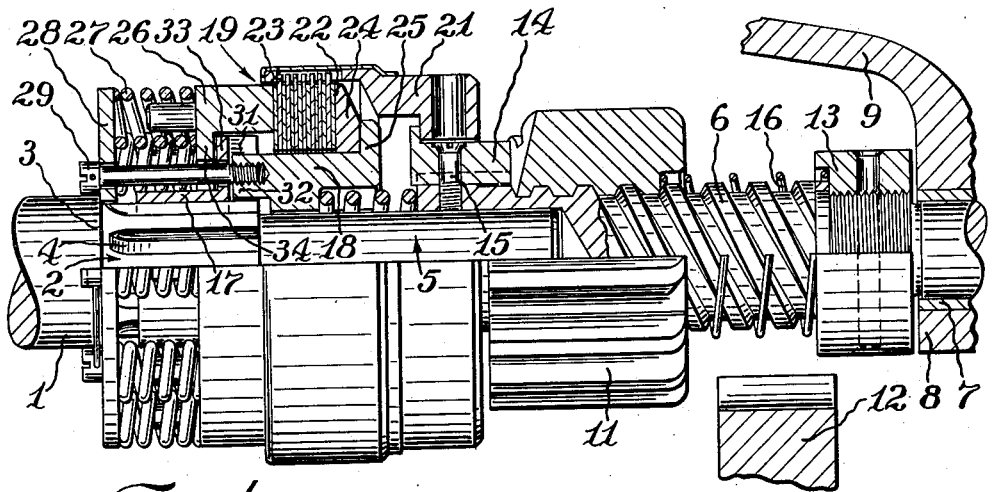
Figure 2:
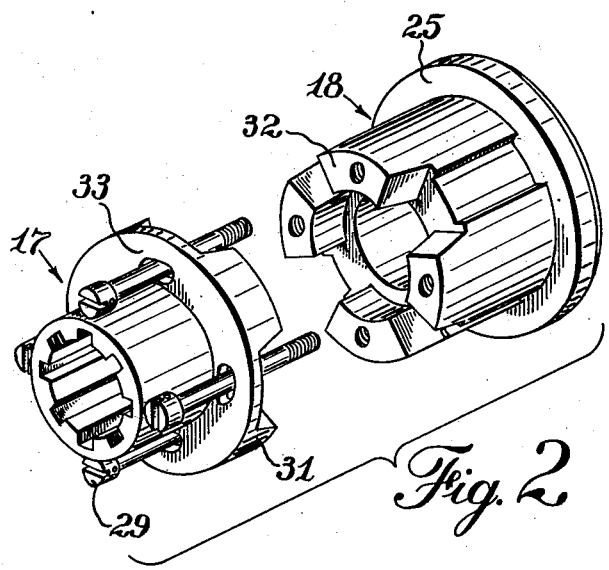

Further objects and advantages will be apparent from the following description taken in connection with the accompanying drawing, in which:

Fig. 1 is a side elevation partly broken away and in section of a preferred embodiment of the invention; and Fig. 2 is a detail in perspective of the driving and driven cam members shown in disassembled relation.

In Fig. 1 of the drawing, there is illustrated a power shaft 1 which may be the extended armature shaft of a starting motor, or may be driven through reduction gearing therefrom. Shaft 1 is provided with a portion 2 of slightly reduced diameter forming a shoulder 3, which portion is provided with longitudinal spline grooves 4. The remainder 5 of the extended portion of shaft 1 is further reduced substantially to the diameter of the bottoms of the spline grooves 4, and provides a bearing for one end of the screw shaft 6 which is slidably journalled thereon. The other end of the screw shaft 6 is journalled as indicated at 7 in an outboard bearing 8 formed in or attached to the housing 9 of the starting motor.

A pinion 11 is threaded on the screw shaft 6 for movement into and out of engagement with a gear 12 of the engine to be started. The operative position of the pinion on the screw shaft is defined by a stop nut 13 suitably fixed on the screw shaft as indicated, and the idle position of the pinion is defined by a backstop member 14 fixed as indicated at 15 to the screw shaft, against which stop the pinion is normally maintained by an anti-drift spring 16.

Means for yieldably connecting the screw shaft 6 to rotate with the power shaft 1 are provided comprising a driving cam member 17 splined on the portion 2 of the power shaft, a driven cam member 18 slidably journalled on the smooth portion 5 of the power shaft, and a friction clutch indicated generally by numeral 19 which connects the driven cam member 18 to a barrel member 21 keyed to the screw shaft by means of the backstop member 14.

The clutch 19 comprises a set of clutch discs 22 splined on the driven cam member 18, and a second set of discs 23 splined in the barrel member 21. A backing ring 24 is seated on the driven cam member 18 against a flange 25 on the end thereof so as to form an abutment for the clutch discs, and a pressure ring 26 is arranged to force the discs against said abutment under the control of a series of springs 27 which are confined by a backing plate 28 adjustably connected to the driven cam member 18 by a plurality of adjustable bolts 29.

The driving cam member 17 has a plurality of axially extending cams 31, the inclined surfaces of which are adapted to engage the similar surfaces of corresponding cams 32 on the driven cam member 18, the inclination of the engaging cam surfaces causing the cam members to repulse each other when torque is transmitted from the driving cam member to the driven cam member. The driving cam member is provided with a radial flange 33, and the pressure ring 26 is provided with an inwardly extending shoulder 34 which is arranged to overlap the flange 33 of the driving cam member whereby the axial thrust of the cam members tending to move them apart is transmitted through the flange 33 to the shoulder 34 to thereby reduce the pressure of the springs 27 on the clutch discs 22, 23. The amount of torque which can be transmitted through the clutch is thus made dependent upon the pressure necessary to compress the springs 27, and the clutch will slip and continue to transmit torque substantially of this value in spite of variations in the frictional coefficients of the brake discs.

In operation, starting with the parts in the positions illustrated in Fig. 1, rotation of the power shaft 1 is transmitted through the driving cam member 17 to the driven cam member 18, and through the clutch discs 22, 23 to barrel 21, which rotates the screw shaft 6. The pinion is thereby traversed into mesh with the engine gear 12 until it engages the stop nut 13 whereupon the pinion is constrained to rotate with the screw shaft. The shock load caused by the engagement of the pinion with the stationary engine gear causes the cam members to repulse each other with an axial force sufficient to compress the clutch springs 27 and permit the clutch discs 22, 23 to slip. During the slipping action, however, they continue to transmit substantially the same amount of torque as was necessary to break them loose, inasmuch as this torque is measured by the axial force necessary to compress the springs 27. When the inertia of the rotative parts of the engine has been overcome, the clutch thereafter transmits cranking torque in the usual manner without the necessity of further slippage unless the engine should backfire, in which case the clutch again slips as soon as the predetermined maximum torque is exceeded.

When the engine starts, the acceleration of the engine gear returns the pinion to idle position in the usual manner where it is retained by the anti-drift spring 16.

Although but one embodiment of the invention has been shown and described in detail, it will be understood that other embodiments are possible and various changes may be made in the form and arrangement of the parts without departing from the spirit of the invention as defined in the claims appended hereto.

What is claimed is:

1. In an engine starter drive, a power shaft, a screw shaft, a pinion having a threaded connection with the screw shaft, a driving member non-rotatably mounted on the power shaft having an axially extending cam projection, a driven member slidably journalled on the power shaft having a cooperating axial cam, a plurality of driving clutch discs splined on the driven cam member, the driven cam member having a flange providing an abutment for the discs, a barrel member non-rotatably connected to the screw shaft, a plurality of driven clutch discs splined in the barrel, a thrust ring pressing the clutch discs toward said abutment, a plurality of compression springs bearing on the thrust ring, a backing plate for the springs, and means for drawing the backing plate toward the driven cam member, said driving cam member having a flange engaging the thrust ring to relieve the pressure of the thrust ring on the clutch discs when the cam members are wedged apart by the transmission of torque therethrough.

2. In an engine starter drive, a power shaft, a screw shaft rotatably mounted thereon, a pinion actuated thereby into and out of mesh with a gear of an engine to be started, a yielding driving connection from the power shaft to the screw shaft including a driving cam member non-rotatably mounted on the power shaft, a cooperating cam member driven thereby, means including a friction clutch connecting the driven cam member to the screw shaft, yielding means closing the clutch and means actuated by the cam members for releasing the clutch, including further, means for adjusting the pressure of the yielding means to thereby vary the torque capacity of the clutch.

3. In an engine starter drive, a power shaft, a screw shaft rotatably mounted thereon, a pinion actuated thereby, a yielding driving connection from the power shaft to the screw shaft including a driving cam member non-rotatably mounted on the power shaft, a cooperating cam member driven thereby, a plurality of friction clutch discs connected alternately to the driven cam member and screw shaft, spring means applying pressure to the clutch discs and means actuated by the axial reaction of the cam members for relieving the pressure of the yielding means on said clutch discs; including further, means for adjusting the pressure of the spring means to control the amount of torque required to slip the clutch.

VERNON E. GLEASMAN.

REFERENCES CITED

The following references are of record in the file of this patent:

UNITED STATES PATENTS

| Number | Name | Date |
|---|---|---|
| 1,446,852 | McGrath | Feb. 27, 1923 |
| 1,764,627 | McGrath | June 17, 1930 |
| 2,407,048 | Whitney et al. | Sept. 3, 1946 |